June 5, 1928.
J. ST. C. WERNIG
1,672,358
AUTOMOBILE BUMPER
Filed July 17, 1926
3 Sheets-Sheet 1
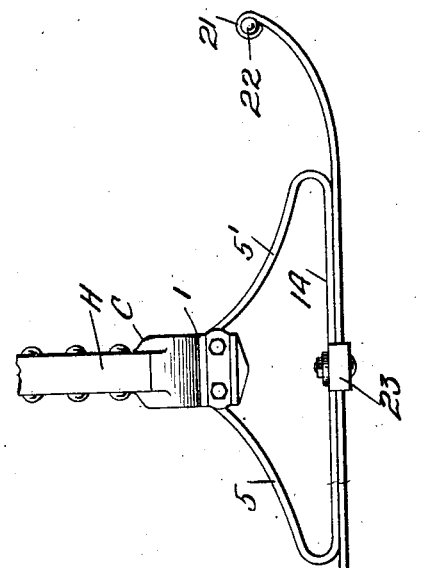
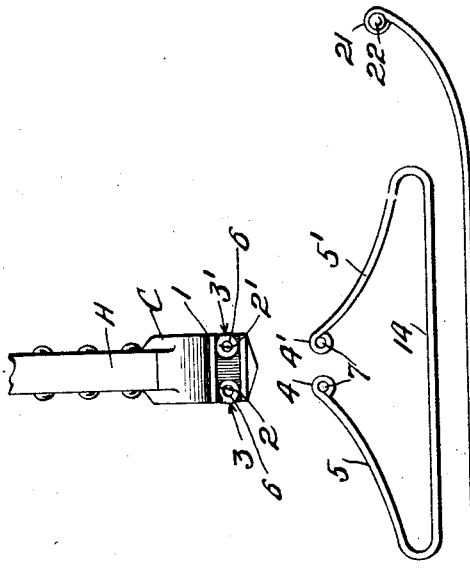
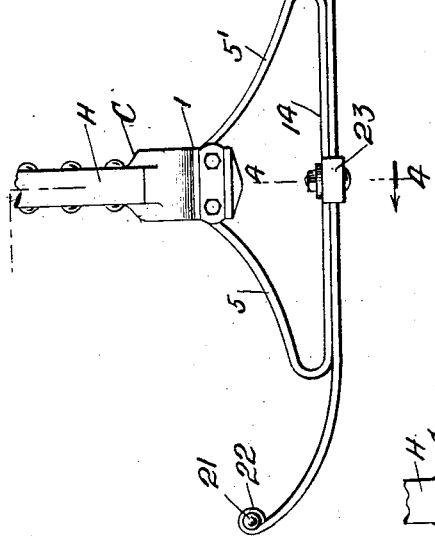
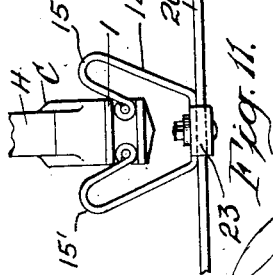

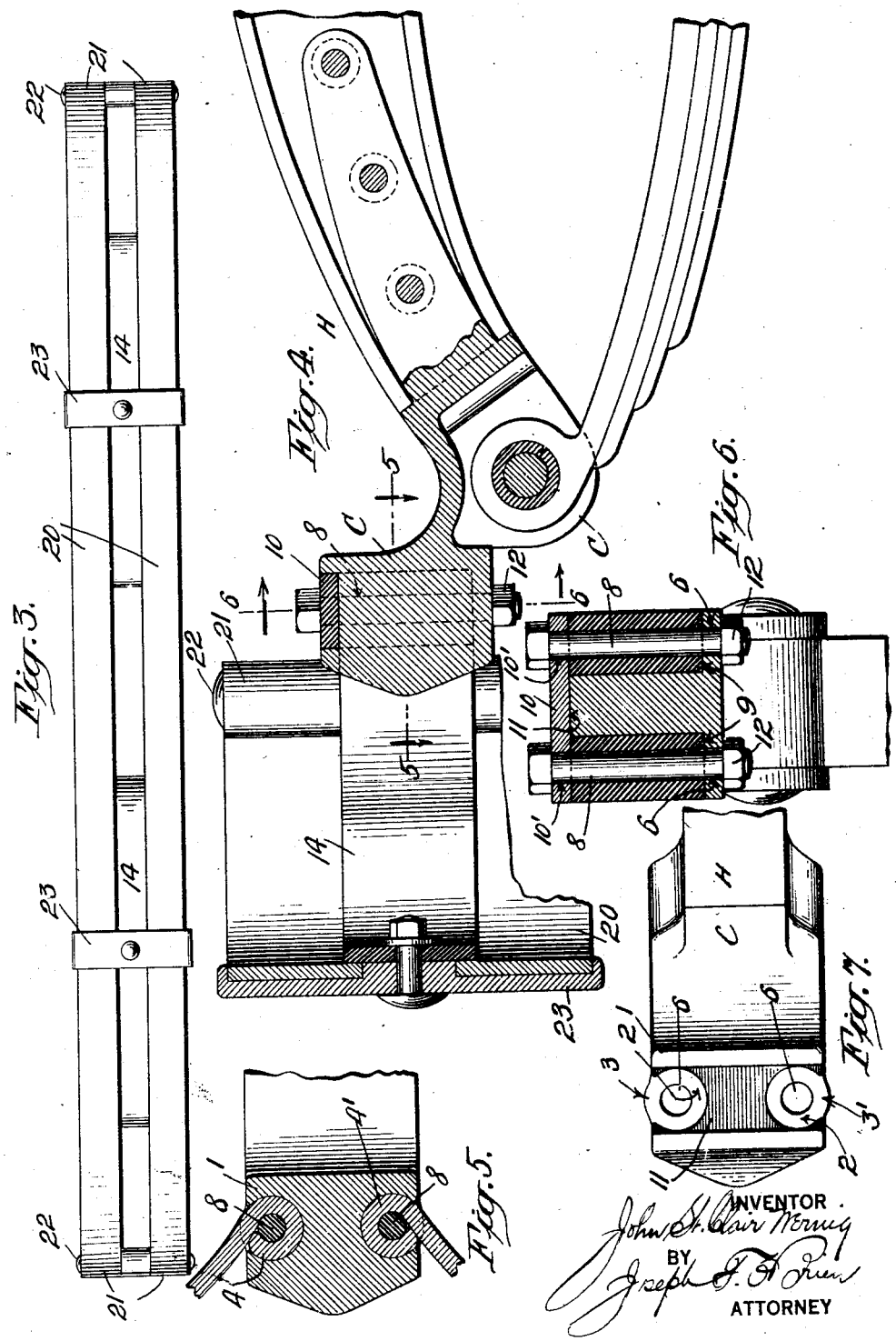

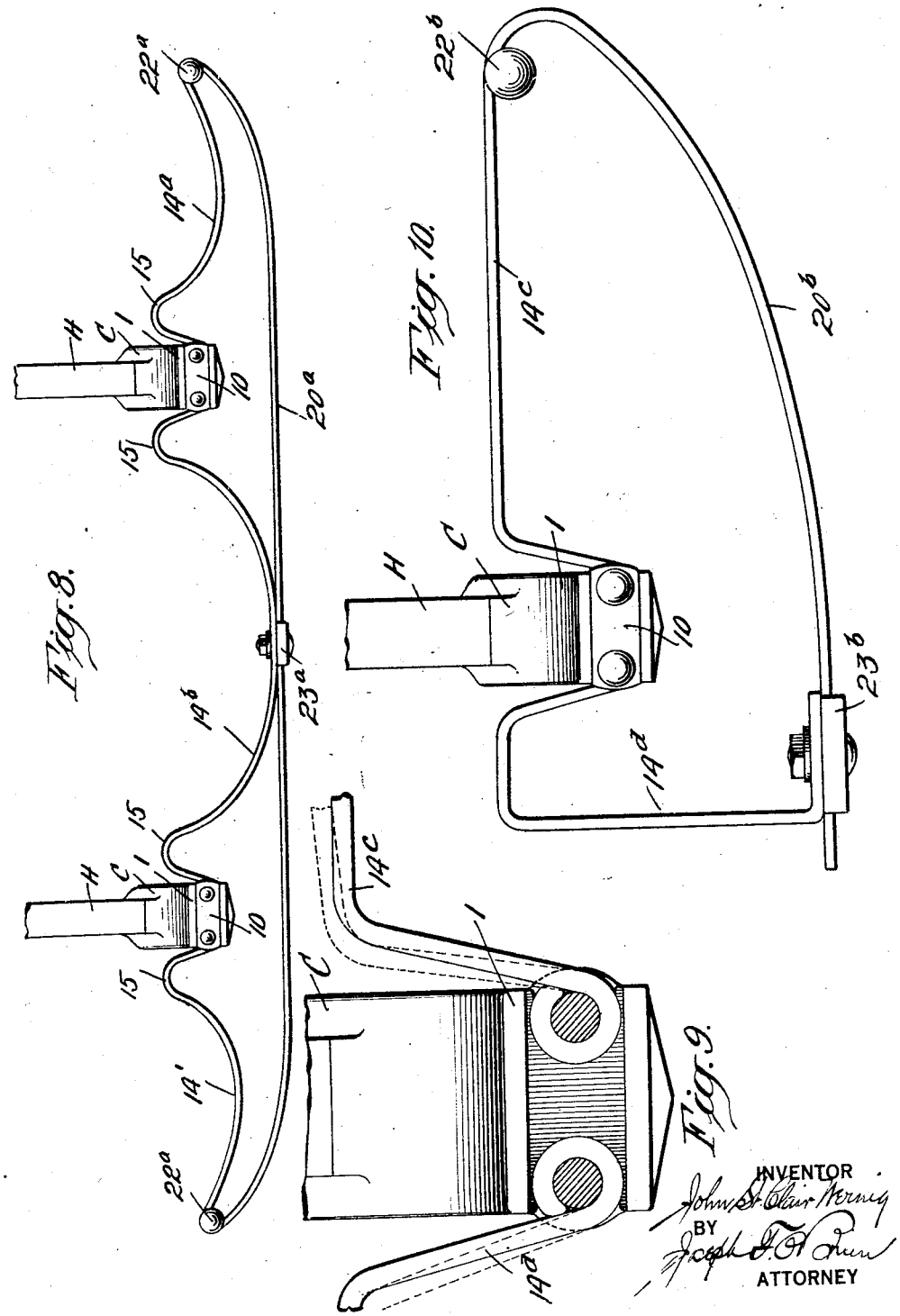

Patented June 5, 1928.

1,672,358

UNITED STATES PATENT OFFICE.

JOHN ST. CLAIR WERNIG, OF BROOKLYN, NEW YORK.

AUTOMOBILE BUMPER.

Application filed July 17, 1926. Serial No. 123,123.

This invention relates to improvements in automobile bumpers and is an improvement upon the automobile bumper shown and described in my co-pending application, Serial No. 47,398, filed August 1, 1925.

One of the objects of the present invention is to simplify the bumper fixture or mounting so as to produce a substantially universal fixture; to increase the facility with which the bumper may be mounted and to produce a mounting which will not only enable a more rigid and non-rattling and non-tilting connection of the bumper with the frame but will enable the bumper and mounting members to be initially mounted in position without the use of bolts and the like and thus to produce a construction in which the bolts merely act as a fastening means and also to provide a means for taking up and compensating by a slight pivotal movement for strains due to slight collisions with the impact member in ordinary traffic conditions.

Another object of the invention is to produce a mounting device in which the detachable supporting members or rear bars will have a rearward bend or rearwardly-disposed loop which will equalize and distribute the weight of the bumper on the supporting connections with the frame and in the case of collision strains, will translate the strain on the frame end from a simple pushing strain to a primary pulling strain on the connection and a secondary pushing strain on the frame end which tends to offset or counterbalance the pulling strain and thus tends to diminish the bending strain on the frame ends of the chassis.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Fig. 1 is a plan view of a bumper and mounting therefor connected to the frame members or horns of an automobile;

Fig. 2 is a similar view of the mounting members and impact bar disconnected or separated from the mounting connections on the automobile frame members or horns;

Fig. 3 is a front elevation of the device shown in Figs. 1 and 2;

Fig. 4 is a section on the line 4—4 of Fig. 1 looking in the direction of the arrow;

Fig. 5 is a section on the line 5—5 of Fig. 4 looking in the direction of the arrow;

Fig. 6 is a section on the line 6—6 of Fig. 4 looking in the direction of the arrow;

Fig. 7 is a plan view of the integral mounting on the end of each horn shown in Figs. 1 to 6 inclusive;

Fig. 8 is a plan view of a modified form of bumper showing means for equalizing the weight of the bumper on the frame ends or horns and for assisting in absorbing and transmitting shocks from collisions to the frame;

Fig. 9 is a horizontal section similar to Fig. 5 showing the rocking of the rear bar when the impact bar is struck at one end to partially absorb the shock; and Fig. 10 is a plan view of my bumper mounting and shock-absorbing means applied to a rear fender guard or bumperette.

Fig. 11 is a fragmentary view, in plan, illustrating a supporting bar or fitting member, similar to that shown and described in Figs. 1 and 2, provided with rearwardly-extending equalizing loops.

Referring now to these drawings which illustrate a preferred embodiment of my invention, H, H are the conventional outwardly inclined frame ends or horns of a motor vehicle chassis. The other parts of the automobile are not shown in the drawings as they form no part of the present invention which in the preferred form, involves the use of improved means for mounting a bumper on the chassis and preferably the use of fittings or mounting members composed of complementary parts, one of which is a fixed supporting element and is preferably formed integrally with the car chassis, and the other of which comprises a movable or detachable supporting member, such as the rear bar of an automobile bumper, fender guard or bumperette.

The horns H, H in an automobile are usually of channel cross section, as indicated in Fig. 4, and carry at the front end thereof a relatively-heavy spring-connector member C usually comprising a drop-forging, which is riveted to the horns by rivets *r* and reinforces the channel bar frame ends.

As illustrated herein and in my said copending application, the drop-forging C has integrally formed therewith an extension portion 1 projecting forwardly and upwardly therefrom. This extension 1 may be of any suitable form and, as shown, comprises a square solid block having an ornamental pyramidal front surface.

In accordance with my present invention, a pair of depressed substantially cylindrical sockets 2, 2' are arranged at opposite sides of the longitudinal median line of said block and have channels 3, 3' extending in opposite directions through the said side edges of the block. These sockets 2, 2' are adapted to receive and form seats for eyes 4, 4' formed at the ends of supporting members comprising bars or bar-portions 5, 5', and the channels 3, 3' receive the bar portions adjacent to said eyes. Each socket has a diameter slightly greater than the eye formed on such bar so as to snugly fit around and engage the outer surface of said eye, and is of a depth equal to the width of said bar and eye. The sockets 2, 2' thus form an initial anchoring means for the movable or detachable bumper-supporting bar or bar portions and an initial interlocking connection or mounting is thus formed between the eyes at the bar ends and said block and car chassis. This will enable the initial mounting of the bumper-supporting members or bars having these eyes and the initial holding of the same in place before further fastening thereof. Said sockets also preferably have horizontal base-plate or mounting floors 9 surrounding centrally-disposed bolt-holes 6 registering with the bores 7 within said eyes so that said eyes may be further fastened to the block by means of bolts 8 which pass through the said bolt-holes 6 and registering bores 7 of the said eyes 4, 4'.

The pair of sockets thus formed at opposite edges of the drop-forging block C are preferably connected by a shallow channel or plate seat 11 so that when a plate 10 is inserted in said seat, it will form a cover for both eyes 4, 4' and this plate is preferably provided with bolt holes 10', 10' also registering with the bores 7 of the eyes so as also to form an abutment for the heads of a pair of bolts 8 adapted to pass through this plate, through the bores or sockets in the eyes and through the bolt holes 6 in the base plate or mounting floor beneath which nuts 12 or the like are threaded on the bolts to more securely fasten the said detachable supporting members to the frame ends or horns.

Any suitable form or shape of supporting member having such eyes may be employed and any means for fastening the bumper or impact member to the supporting members may be used. Thus in Figs 1 to 6 of these drawings, I have shown a fitting-member or bar 14 bent into triangular shape and having at its ends a pair of such eyes 4, 4' which fit within the sockets at the edge of the block and are subsequently fastened by the bolts 8. In Fig. 8, I have shown three rear bars 14', 14ᵃ and 14ᵇ of a bumper provided with eyes adapted to fit within the pair of sockets at the edges of the said block, while in Fig. 10 I have shown a pair of rear bars 14ᶜ and 14ᵈ for a sectional fender guard of bumperette similarly provided with a pair of eyes mounted within sockets in the horn ends or frame and fastened thereto by said double pivotal connection.

In each case, the detachable supporting member whether it be a part of a fitting or a back bar of a bumper will have at least one connection between the terminal eye and the socketed block and this connection will comprise an interlocking engagement of the outer surfaces of said eyes with the sockets in said block and also a secondary connection and fastening between the eye and the bolts and block, thus providing for each eye a double pivotal connection between said eye and the block.

Any suitable form of impact member may be employed and, as illustrated, I have in the form of my invention shown in Figs. 1 to 6, utilized an impact member of a double-bar or extended-area type, which, as shown more particularly in Fig. 3, comprises two impact bars 20, having eyes 21 turned inwardly at each of their outer ends and connected together by bolts 22, said impact member being, as shown, connected to triangular, detachable supporting-members or bars 14 by clamps 23. In the modification shown in Fig. 8, an impact member 20ᵃ is provided with end eyes and connected at opposite ends to the ends of rear detachable supporting-members comprising bars 14', 14ᵃ by an eye bolt connection 22ᵃ and is fastened at its middle portion to the centrally-disposed rear bar 14ᵇ by means of a clamp 23ᵃ. In Fig. 10, I have shown a sectional impact member 20ᵇ connected with rear-supporting members comprising bars 14ᶜ and 14ᵈ by an eye and bolt connection 22ᵇ at one end and by a clamp 23ᵇ at the other end.

In Fig. 11, I have shown a fitting member 14' provided with rearwardly extending loops 15' and having pivotal frame connections in all respects similiar to those hereinabove described.

In said Figs. 8 to 11, however, I provide an additional novel feature comprising an equalizing rear bend or loop 15 which extends to the rear of the connection of the supporting member with the frame ends and will not only equalize and distribute the weight of the bumper equally upon the frame ends or horns but because of the fact that the bumper is pivotally connected to these frame ends, any shocks due to collisions in ordinary traffic lanes which are not taken up by the impact bars will be partially absorbed by the pivotal movement of one or the other of the rear bars or bar portions toward the side of the frame ends, according to the direction from which the blow or shock of the collision strikes on the impact bar. Furthermore, because of the fact that the loop is bent rearwardly of the connection with the frame end, the strain on the pivotal connections and frame ends from a blow on the impact member will be translated by the loop from a rearward and inward pushing strain on the said double pivotal connection to a combined or divided pulling and pushing strain. Thus, there will be a rearward and outward pulling strain on the said connection but this rearward and outward pulling strain will, however, be partially offset and counter-balanced by a simultaneous pushing strain exerted by the loop on the connection and upon the side of the frame end. This counter-balancing pushing strain will increase in accordance with the intensity of the blow or shock until the adjacent leg of said loop or bend abuts against the side of the frame end and until the loop or rearward bend collapses. It will be seen, therefore, that my pivotal connection of the detachable bumper-supporting members with the frame tends by a pivotal movement to absorb light shocks, and that the use of the rearwardly-extending loop divides the strain into counter-balancing portions and thus reduces the bending strain on the frame ends from a given shock of a collision with the impact members whether such shock or strain is of large or slight intensity.

Having described my invention, I claim:—

1. An automobile bumper embodying an impact member, rear supporting bars having at their outer ends a connection with said impact member and at their inner ends having a pivotal connection with an automobile frame, said supporting bars being each provided, between the said pivotal frame connection and impact-member connection, with a loop extending rearwardly of the said frame connection.

2. An automobile bumper embodying an impact member, rear supporting bars having at their outer ends a connection with said impact member and at their inner ends having a pivotal connection with an automobile frame, said supporting bars being each provided, between the said pivotal frame connection and impact-member connection, with a loop extending rearwardly of the said pivotal frame connection.

3. An automobile bumper embodying an impact member, rear supporting bars having at their outer ends a connection with said impact member and at their inner ends having a connection with an automobile frame, said supporting bars being each provided, between the said frame connection and impact-member connection, with a loop extending rearwardly of the said frame connection, said frame-connection comprising eye-formations arranged to interlock with and swing pivotally in a socket in said frame connection and a bolt suitably mounted in said frame connection and with which said eye-formations are also pivotally connected.

4. An automobile bumper embodying an impact member, rear supporting bars having at their outer ends a connection with said impact member and at their inner ends having a connection with an automobile frame, said supporting bars being each provided, between the said frame connection and impact-member connection, with a loop extending rearwardly of the said frame connection, said frame connection comprising eye-formations arranged to interlock and swing pivotally in a socket in said frame connection and a bolt suitably mounted in said frame connection, said loop being disposed adjacent to said frame connection and comprising a rearwardly-extending portion arranged close to said frame member, a curved loop portion and an outwardly-extending portion connected to said impact member.

5. An automobile bumper support embodying a supporting bar member having an eye-formation at an end thereof, in combination with a stationary mounting member for said bar having a socket adapted to provide a seat which will engage and interlock with the outer surface of said eye-formation on said bar.

6. An automobile bumper support embodying supporting-bar members having eye-formations at an end thereof in combination with mounting members for said bars, each mounting member having a pair of sockets adapted to engage and interlock with the outer surfaces of a pair of eye-formations on said bars.

7. An automobile bumper support embodying supporting-bar members having eye-formations at the end thereof, in combination, with mounting members for said bars, each mounting member having a pair of sockets adapted to engage and interlock with the outer surfaces of a pair of eye-formations on said bars, one member of each pair being arranged at one of the opposite sides of the longitudinal median line of said mounting member.

8. An automobile bumper support embodying supporting-bar members having eye-formations at an end thereof, in combination, with mounting members for said bars, each mounting member having a pair of sockets adapted to engage and interlock with the outer surfaces of a pair of eye-formations on said bars, said sockets being formed in the side edges of said mounting members and having side channels to permit insertion of the supporting bar and its eye-formation.

9. An automobile bumper support embodying supporting-bar members having eye-formations at an end thereof, in combination, with mounting members for said bars, each mounting member having a pair of sockets adapted to engage and interlock with the outer surfaces of a pair of eye-formations on said bars, said sockets being formed in the side edges of said mounting members and having side channels to permit insertion of the supporting bar and its eye-formation, each of said sockets being of a depth substantially equal to the width of the bar to provide a firm bearing and interlocking connection therewith.

10. An automobile bumper support embodying supporting-bar members having eye-formations at an end thereof, in combination, with mounting members for said bars, each mounting member having a pair of sockets adapted to engage and interlock with the outer surfaces of a pair of eye-formations on said bars, said sockets being formed in the side edges of said mounting members and having side channels to permit insertion of the supporting-bar and its eye-formation, each of said sockets being of a depth substantially equal to the width of the bar to provide a firm bearing and interlocking connection therewith and a nut and bolt connection between said eye-formation and said mounting member.

11. An automobile bumper support embodying supporting bar members having eye-formations at an end thereof, in combination, with mounting members for said bars, each mounting member having a pair of sockets adapted to engage and interlock with the outer surface of a pair of eye-formations on said bars, said sockets being formed in the side edges of said mounting members and having side channels to permit insertion of the supporting-bar and its eye-formation, each of said sockets being of a depth substantially equal to the width of the bar to provide a firm bearing and interlocking connection therewith and a nut and bolt connection between said eye-formation and said mounting member, a cover plate seat within said mounting member, a cover plate within said seat and nuts and bolts extending through said seat within said eye-formation and through the base of said mounting member to connect the bars having said eye-formations connected to the chassis frame.

In witness whereof, I have signed my name to the foregoing specification.

JOHN ST. CLAIR WERNIG.